Sept. 29, 1964 H. A. CARLSON 3,151,250
SPINNING RESERVE PEAKING GAS TURBINE
Filed Dec. 26, 1962

INVENTOR
HAROLD A. CARLSON
BY W. C. Crutcher
HIS ATTORNEY 3,151,250
SPINNING RESERVE PEAKING GAS TURBINE
Harold A. Carlson, Schenectady, N.Y., assignor to General Electric Company, a corporation of New York
Filed Dec. 26, 1962, Ser. No. 247,255
9 Claims. (Cl. 290—52)

This invention relates to an improved "peaking turbine" for supplying power to an electrical network during periods of increased demand, and more particularly to a peaking gas turbine which is maintained in a spinning reserve condition and therefore available to supply power on very short notice.

The use of supplemental "peaking" generators to provide additional power during periods of heavy demand is well known. Since such demands may occur on very short notice, one requirement for such a peaking unit is that it be capable of starting quickly to supply power, without the necessity for the extensive start-up procedures required for some types of prime movers. Gas turbines and diesel motor-generator sets have been suggested for peaking service, since these generally require less time to start than steam turbines. However, diesel engines are limited in size and a substantial number of these devices are necessary to meet peak loads on most systems and to provide reserve power against the "outage" of the base load steam turbines running on the system. On the other hand, with a large combustion gas turbine, the turbine rotor must be brought up to temperature slowly before the generator can be synchronized and placed on the line. Furthermore, the massive high-inertia rotor requires time to accelerate to normal operating speeds. This starting time typically is on the order of 10 to 20 minutes.

Accordingly, one object of the present invention is to provide an improved peaking gas turbine-generator unit which is available to supply peaking power on very short notice.

Another object of the invention is to provide an improved peaking gas turbine wherein the rotor is maintained at normal operating speed and temperature and instantly available to accept load, yet which is economical to maintain in this condition.

Figure 1:
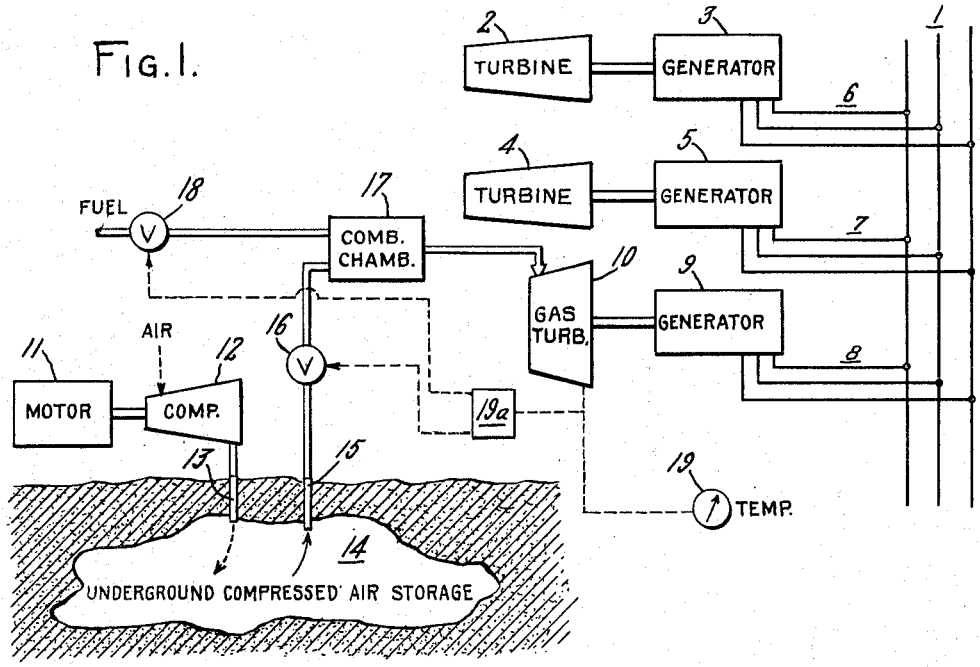
Figure 2:
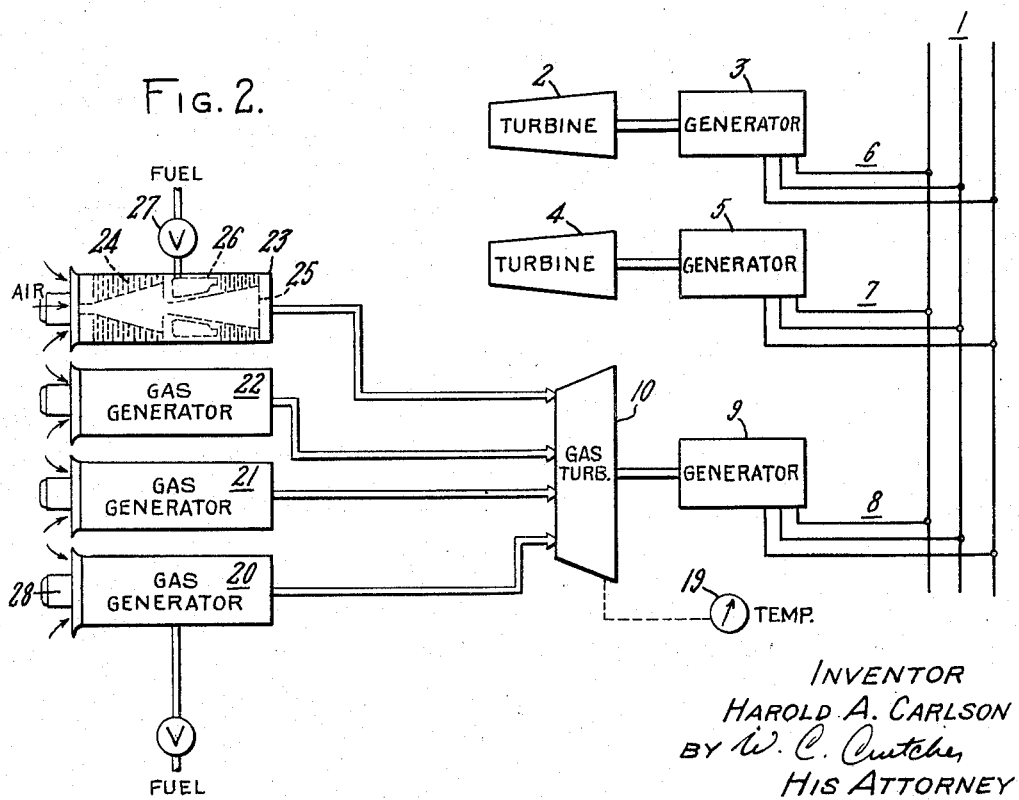

Further objects and advantages of the invention will become apparent from the following description, taken in connection with the accompanying drawing, in which:

FIG. 1 is a schematic simplified view of a peaking gas turbine according to the invention, utilizing underground compressed air storage, and, FIG. 2 is a modified form of the invention utilizing quick starting gas generators.

Briefly stated, the invention is practiced by employing a gas turbine-generator unit in which the generator also acts as a motor when the peaking turbine is not in service, to maintain the load turbine at normal operating speed. The friction-windage losses of the turbine blades serve to maintain the turbine rotor at an elevated temperature, so the hot motive fluid, supplied from a quick-starting source such as underground compressed air storage or a quick-starting gas generator, can be instantly utilized by the turbine rotor without danger of "thermal shock" to the high temperature parts.

Referring now to FIG. 1 of the drawing, an electrical network, represented by power lines 1, is supplied during normal periods by other units such as steam turbines 2, 4 driving generators 3, 5 and connected to power lines 1 by means of lines 6, 7 respectively. The generators 3, 5 need not, of course, be located in physical proximity to one another as shown, but are only representative of several widespread energy sources supplying power to the interconnected network lines 1.

Also connected to power lines 1 over lines 8 is a peaking generator 9 and a connected load turbine 10. The load turbine 10 may consist of one or more stages of rotor blades and, when supplied with hot motive fluid, will deliver power to generator 9 to supply power to network 1 during periods of high demand. On the other hand, if hot motive fluid is not supplied to turbine 10, and generator 9 remains connected to power lines 1, generator 9 will act as a motor and extract electrical power from power lines 1. This power is used to turn the interconnected rotors of generator 9 and gas turbine 10, the power consumption being just that required to supply the bearing friction and windage losses of the turbine-generator 9, 10.

The quick starting source of hot motive fluid may consist of an underground compressed air storage arrangement, as in FIG. 1. During periods of low demand, as during the night hours, a suitable motor 11 driving a compressor 12 supplies compressed air through a pipe 13 leading to a sealed underground chamber 14. The underground chamber 14 may consist of a series of interconnected caves, either natural or artificial. Flow of compressed air to the underground chamber 14 during periods of low demand is illustrated by the dotted arrow 13a.

When it is desired to obtain hot motive fluid for placing generator 9 and peaking load turbine 10 on the line, compressed air is allowed to flow from chamber 14 through a pipe 15, as controlled by valve 16, to a combustion chamber 17. Liquid or gaseous fuel is also supplied to combustion chamber 17 through a valve 18. The combustion chamber 17 has no heavy high temperature parts requiring prewarming, and hence may be ignited and made ready instantly to supply hot motive fluid to load turbine 10 without the necessity for an extensive startup cycle.

The temperature inside load turbine 10 is sensed by a suitable temperature indicator 19, which is shown simply as a visual dial, although ordinarily suitable automatic control devices would be used to sense and control load turbine temperature, represented by the automatic control device 19a, connected to actuate air and fuel supply valves 16, 18.

FIG. 2 illustrates a modified form of the invention wherein the elements which are comparable to those of FIG. 1 have the same reference numerals. In lieu of the compressed air storage arrangement of FIG. 1, however, a number of quick-starting gas generators 20, 21, 22, 23 are employed. These may be oriented in any desired manner with respect to gas turbine 10, emanating radially therefrom, or disposed around a cylindrical frame in line with the periphery of turbine 10. As shown in the dotted lines in gas generator 23, a suitable form of gas generator may consist of an aircraft type "jet engine." This would consist of a compressor 24 connected to a turbine 25, the latter merely serving to drive the compressor. A number of combustion chambers 26 furnished with fuel through a valve 27 serve to heat the compressed air. Since the aircraft type compressor and turbine components of gas generators 20–23 are extremely lightweight and designed for relatively short life, they are very rapid starting and are instantly available to supply hot motive fluid to gas turbine 10 without any extensive warm-up procedure. Starting motors 28 are provided to bring the motors of the gas generators up to starting speed, similar to the starting of aircraft gas turbines. In contrast, the ordinary combustion gas turbine would have a single heavy compressor rotor and associated compressor-turbine stage, which would have to be started up relatively slowly. The gas generators 20–23 may be operated all together or separately, as required, to furnish the desired power. One or more gas generators may be operated if desired, when generator 9 is not furnishing power but is acting as a motor. In this case, the primary function of the gas generators would be for more accurately controlling the temperature of turbine 10.

For temperature control of the gas turbine 10, sensed by indicator 19, the gas generators may be employed as follows. For supplementing the temperature of turbine 10 when windage losses are insufficient to keep it at the desired temperature, one or more of the gas generators 20–23 can be run at very low fuel consumption, offering considerable economy of operation. If windage losses are tending to cause the turbine 10 to overheat, the gas generators can also be used to supply cooling air simply by rotating them with starting motors 28, whereupon they act as blowers.

The operation of the arrangement disclosed in FIG. 1 is as follows. Generator 9 remains "synchronized" and connected to the network at all times. During periods of low demand, the motor 11 and compressor 12 function to periodically replenish underground compressed air storage chamber 14 with air at a suitable pressure, for example, on the order of 100 p.s.i. Meanwhile, generator 9 acts as a motor and withdraws electrical power from network 1, which is used to turn the connected rotors of the turbine-generator 9–10 at normal rated speed. The resultant churning of the stagnant air inside load turbine 10 by the turbine rotor blades generates substantial quantities of heat. This prewarms and raises the temperature of the gas turbine rotor to an elevated temperature, which is detected by the temperature gauge 19. Thus the only power withdrawn from power lines 1 is that required to supply the rotational and windage losses of generator 9 and gas turbine 10. This power required is only a fraction of that which can be returned to the electrical system during peak demands by generator 9.

The temperature of the load turbine 10 is maintained at a selected constant elevated temperature by cooling or heating sources which adjust the temperature produced by windage losses. In the event that the heat generated by windage losses is not exactly correct to keep the gas turbine rotor at the desired temperature, the blading may, for instance, be cooled somewhat by admitting a small amount of compressed air by opening valve 16, or it may be heated somewhat by supplying small amounts of air and fuel through valves 16, 18 to combustion chamber 17, where they are burned at a very low rate of fuel consumption and supplied to turbine 10. Hence the "gas generator" of FIG. 1, i.e., the compressed air source together with the combustion chamber, can either furnish cooling air or can furnish heat at a low rate of fuel consumption to adjust the temperature detected by gauge 19, and controlled by device 19a, to cause the rotor blading of load turbine 10 to be held exactly at the desired temperature at which it can accept load without damage. This temperature may be on the order of 1000 degrees F.

When it is desired to supply peaking power, all that is necessary is to open valves 16, 18 to the full load positions and to ignite combustion chamber 17 (if it is not already operating at a reduced rate, as described above). This can be done very quickly, the starting cycle requiring perhaps less than 30 seconds.

The operation of FIG. 2 is similar to that of FIG. 1. During "off periods," generator 9 acts as a motor to turn the rotor of load turbine 10 at full rated speed. The windage losses heat the turbine blading and maintain it at an elevated temperature as detected by temperature gauge 19. One or more of the gas generators 20–23 may be operated at a reduced rate of fuel consumption to adjust the temperature of the load turbine 10 to any selected value in the event that windage losses are insufficient to maintain the blading at the desired temperature. In the event the windage losses generate too much heat, the gas generators supply cooling air by acting as blowers when operated on starting motors 28 with the combustion chambers unlit. Thus the gas generators serve as a means to adjust the temperature of gas turbine 10 while it is maintained in a "spinning reserve" condition.

Upon a requirement for increased power, it is only necessary to start up the remainder of the gas generators which, because of their light weight and reliable construction, are almost instantly available to supply hot motive fluid to the gas turbine 10. Turbine 10, in turn, will pick up load and supply power to the electrical system by means of the generator 9.

Thus it can be seen that the invention provides a means to maintain a peaking gas turbine at speed and temperature in a spining reserve condition, as to be instantly available to supply power in a mater of a few seconds. Various other quick-starting arrangements for sources of hot moitve fluid for load turbine 10 will be apparent to those skilled in the art. Therefore, it is intended to cover in the appended claims all such modifications as fall within the true spirit and scope of the invention.

What I claim as new and desire to secure by Letters Patent of the United States is:

1. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to be driven by the turbine, the generator being also electrically connected to the distribution network and adapted to withdraw power from the network to act as a motor to drive the turbine, a quick-starting source of motive fluid connected to supply hot motive fluid to the gas turbine so the turbine can supply power to drive the generator, on short notice, and means for adjusting the temperature of the high temperature parts of the gas turbine including supplementary sources of heating and cooling fluid supplied to hold the rotor temperature relatively constant at a selected elevated temperature substantially in the normal operating temperature range of the gas turbine when operating under load.

2. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to said turbine and also electrically connected to said network, said generator withdrawing power from the network and acting as a motor to turn the turbine, a quick-starting source of motive fluid connected to supply hot motive fluid to the rotor blades on short notice so that the turbine can supply power to the generator, and, means for adjusting the elevated temperature of the turbine rotor caused by said windage losses, including temperature responsive means and control means arranged to adjust supplemental fluid flow from said source to the rotor, to hold the rotor at a selected, relatively constant, elevated temperature in the normal operating temperature range of the gas turbine when operating under load.

3. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to said turbine and also electrically connected to said network, said generator withdrawing power from the network and acting as a motor to turn the turbine, a quick-starting source of motive fluid connected to supply hot gases produced by the combustion of fuel in compressed air to the rotor blades on short notice so that the turbine can supply power to the generator, means responsive to the temperature of the turbine rotor, and temperature regulating means for adjusting the temperature of the rotor to hold it at a selected relatively constant temperature in the normal operating temperature range of the gas turbine under load, said temperature regulating means comprising a plurality of valves connected to supply either compressed cooling air or small amounts of combustion gases from said source to the turbine rotor as required to supplement the heat caused by windage losses.

4. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to said turbine and also electrically connected to said network, said generator withdrawing power from the network and acting as a motor to turn the turbine, a quick-starting source of motive fluid connected to supply hot motive fluid to the rotor blades on short notice so that the turbine can supply power to the generator, means responsive to the temperature of said rotor, and means for supplying cooling air from said motive fluid source during low demand periods to reduce the rotor temperature caused by windage losses to a selected relatively constant elevated temperature in the normal operating temperature range of the gas turbine when operating under load.

5. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to said turbine and also electrically connected to said network, said generator withdrawing power from the network and acting as a motor to turn the turbine, a quick-starting source of motive fluid connected to supply hot gases produced by the combustion of fuel in compressed air to the rotor blades on short notice so that the turbine can supply power to the generator, means responsive to the temperature of said rotor, and regulating means for said hot motive fluid source adapted to supply a small quantity of hot motive fluid at low rates of fuel consumption to the turbine during periods of low demand so as to supplement the heat caused by windage losses and to maintain the rotor temperature sensed by said temperature-responsive means relatively constant at a selected elevated temperature in the normal operating temperature range of the gas turibne when operating under load.

6. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to said turbine and also electrically connected to said network, said generator withdrawing power from the network and acting as a motor to turn the turbine, a quick-starting source of motive fluid comprising a periodically replenished reservoir of compressed air and a combustion chamber supplied by fuel and by the air from said reservoir, said combustion chamber being connected to supply hot motive fluid to the rotor blades of the turbine, and means for regulating the temperature of the turbine rotor either by supplying cooling air thereto from the reservoir or by supplying a small quantity of hot motive fluid thereto from said combustion chamber at low rates of fuel consumption, so as to hold the rotor at a selected relatively constant elevated temperature in the normal operating temperature range of the gas turbine when operating under load.

7. A spinning reserve gas turbine-generator for supplying peaking power to an electrical distribution network normally supplied by other sources of electrical power, comprising:

a load gas turbine having a bladed rotor turning at substantially full speed and maintained at an elevated temperature by internal friction heat generated by windage losses of the rotating blades, a generator coupled to said turbine and also electrically connected to said network, said generator withdrawing power from the network and acting as a motor to turn the turbine, a quick-starting source of motive fluid comprising a source of combustible fuel under pressure and an underground reservoir of periodically replenished compressed air, said reservoir being connected through a combustion chamber to the turbine for supplying hot combustion fluid to the rotor blades on short notice so that the turbine can supply power to the generator, and means for regulating the flow of compressed air from said reservoir to the turbine to hold the rotor at a selected relatively constant elevated temperature in the normal operating temperature range of the gas turbine when operating under load.

8. A method for supplying peaking power to an electrical distribution network on short notice, comprising the steps of:

providing a generator with a gas turbine mechanically coupled thereto, said turbine having a bladed rotor adapted for receiving hot motive fluid at a normal rate of flow to drive the turbine and generator, connecting said generator to the distribution network so that it acts as a motor to drive the turbine at substantially normal speed, monitoring the elevated temperature in the turbine caused by heat generated due to the turbine blading windage losses, adjusting the turbine temperature by adding small amounts of heating or cooling fluid to hold the rotor temperature relatively constant at an elevated temperature in its normal operating range, and supplying hot motive fluid at said normal rate of flow to the turbine from a quick-starting source whenever peaking power from the generator is desired.

9. The method of supplying peaking power to an electrical distribution network from a generator connected to be driven by a gas turbine supplied with hot motive fluid when the generator is to deliver power to the network, which includes the steps of:

during periods of low demand on the network supplying electrical energy from the network to the generator to cause it to run as a motor and drive the gas turbine at substantially normal speed, maintaining during said low demand periods a preselected temperature of the gaseous fluid in the gas turbine casing substantially equal to the temperature level obtaining in normal operation of the gas turbine, and supplying hot motive fluid to the gas turbine for driving the generator whenever peaking power is to be delivered by the generator to the network.

References Cited in the file of this patent

FOREIGN PATENTS

| | | |
|---|---|---|
| 1,048,468 | France | Dec. 22, 1953 |
| 329,159 | Switzerland | May 31, 1958 |